United States Patent
Bain

(10) Patent No.: US 10,346,633 B2
(45) Date of Patent: *Jul. 9, 2019

(54) SECURE DATABASE SEARCHING

(71) Applicant: Business Partners Limited, London (GB)

(72) Inventor: Simon Ian Bain, Berwickshire (GB)

(73) Assignee: Business Partners Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,022

(22) Filed: Nov. 4, 2016

(65) Prior Publication Data

US 2017/0169247 A1    Jun. 15, 2017

Related U.S. Application Data

(63) Continuation of application No. 14/360,445, filed as application No. PCT/GB2012/000858 on Nov. 23, 2012, now Pat. No. 9,519,797.

(30) Foreign Application Priority Data

Nov. 24, 2011   (GB) .................................. 1120314.8

(51) Int. Cl.
   *G06F 12/14*      (2006.01)
   *G06F 21/62*      (2013.01)
   (Continued)

(52) U.S. Cl.
   CPC .......... *G06F 21/6227* (2013.01); *G06F 16/22* (2019.01); *G06F 16/24554* (2019.01);
   (Continued)

(58) Field of Classification Search
   CPC ............. G05B 15/02; H01M 8/04626; H01M 16/006; H01M 8/04925; H01M 2250/10;
   (Continued)

(56) References Cited

U.S. PATENT DOCUMENTS 5,544,357 A * 8/1996 Huei ................... G06F 17/3056
                                                   707/715
7,552,327 B2 * 6/2009 Halcrow ................ G06F 21/46
                                                   713/165
(Continued)

FOREIGN PATENT DOCUMENTS

CN    1347050 A    5/2002
CN    1533163 A    9/2004
(Continued)

OTHER PUBLICATIONS

Mar. 3, 2016—(CN) Notice of First Office Action—App 201280067738.9.
(Continued)

*Primary Examiner* — Mohammed Waliullah
(74) *Attorney, Agent, or Firm* — Banner & Witcoff, Ltd.

(57) ABSTRACT

Method and system for securely storing data in a database comprising: receiving data to be stored. Dividing the data into a plurality of elements. Encrypting each element of the plurality of elements with an encryption function. Combining the encrypted elements to form a data attribute. Storing the data attribute in the database.

Method and system for searching a database having encrypted data attributes comprising: receiving a search term. Encrypting the search term with an encryption function. Searching a database for records having data attributes matching the encrypted search term.

12 Claims, 3 Drawing Sheets

(51) Int. Cl.
*G06F 16/22* (2019.01)
*G06F 16/2455* (2019.01)
*G06F 21/60* (2013.01)

(52) U.S. Cl.
CPC ........ *G06F 21/602* (2013.01); *G06F 21/6218* (2013.01); *G06F 21/6245* (2013.01)

(58) Field of Classification Search
CPC ......... H01M 8/04604; H01M 2220/10; H01M 8/04947; H01M 8/0612; H01M 8/0494; H01M 8/04365; H01M 10/48; H02J 7/34
See application file for complete search history.

(56) References Cited

U.S. PATENT DOCUMENTS

| | | | |
|---|---|---|---|
| 7,644,127 B2 | 1/2010 | Yu | |
| 7,689,969 B1* | 3/2010 | Wendling | G06F 21/14 |
| | | | 713/189 |
| 2003/0007640 A1* | 1/2003 | Harada | G06F 21/10 |
| | | | 380/270 |
| 2009/0012957 A1* | 1/2009 | Villaret | G06F 7/02 |
| 2010/0153403 A1 | 6/2010 | Chang et al. | |
| 2010/0211800 A1 | 8/2010 | La Rocca et al. | |
| 2011/0179077 A1 | 7/2011 | Pulnikova | |
| 2012/0054489 A1* | 3/2012 | Ranzini | G06F 17/30528 |
| | | | 713/165 |

FOREIGN PATENT DOCUMENTS

| | | |
|---|---|---|
| CN | 101802836 A | 8/2010 |
| EP | 1193585 A2 | 4/2002 |
| EP | 1463307 A2 | 9/2004 |
| JP | 2006331235 A | 12/2006 |

OTHER PUBLICATIONS

Feb. 20, 2013—International Search Report and Written Opinion—PCT/GB2012/000858.

Schneier B Ed—Schneier B: "Applied Cryptography, Protocols, Algorithms, and Source Code in c, Passage",Jan. 1, 1996 (Jan. 1, 1996), Applied Cryptography, Protocols, Algorithms, and Source Code in c, John Wiley & Sons, Inc, New York, pp. 56-65,461.

* cited by examiner

SECURE DATABASE SEARCHING

CROSS-REFERENCE TO RELATED CASES

This application is a continuation of U.S. application Ser. No. 14/360,445, filed on May 23, 2014, entitled "Secure Database Searching", which claims priority to International Patent Application No. PCT/GB2012/000858, filed Nov. 23, 2012, which in turn claims priority to Great Britain Patent Application No. 1120314.8, filed Nov. 24, 2011, each of which is hereby incorporated by reference in their entireties for all purposes.

FIELD OF THE INVENTION

The present invention relates to securing databases and searching within such secured databases.

BACKGROUND OF THE INVENTION

Databases and other digital record stores may be protected by passwords, firewalls and other security mechanisms. However, once such security measures are breached then the data may be freely accessible. Therefore, encryption may be used to secure particular attributes, fields or columns within records of a database.

For example, during a SQL insert procedure to add a record to a database, certain columns may be defined as being encrypted. An encryption algorithm may be applied to the values destined for such columns before the data are added. When such data are retrieved then a corresponding decryption function may be applied to the encrypted attributes or values before the data is presented to a calling function.

In such an example, a user could place a record in a dataset with a SQL statement such as:
INSERT INTO dataset (creditCardNumber, cardType, expiryDate, emailAddress, postalAddress) VALUES ('1234 4321 1234 4321', 'VISA', '00-00-00', 'someone@somewhere.com', '1 The Street, Postal Town, Somewhere')

The database may be configured to encrypt the fields creditCardNumber and expiryDate. When the above statement is processed by the database management system, the values 1234 4321 1234 4321 and 00-00-00 will then be automatically encrypted prior to being stored.

As it is not possible to match search results (i.e. a WHERE clause within a SELECT query) to encrypted fields, columns or attributes then at least some of the fields in a record must be in plain text to facilitate retrieval. Therefore, at least some of the data, which is usually some form of business data (i.e. non-primary key data) must be stored in plain text.

This compromise allows searching and retrieval but can reduce the overall security of the database. Unauthorised access to the database can lead to access to some plain text information. The intruder may use this unencrypted information to determine the most valuable encrypted records and focus any substantial attack on such higher value records. In other words, whilst it may be impractical or impossible to decrypt the entire database, it may be relatively trivial to identify a small subset of high value records that are possible to decrypt within reasonable time frames.

Such a focused attack would be harder to carry out if all columns in the database were encrypted but this would frustrate legitimate searching and retrieval of data.

Therefore, there is required a system and method that overcomes these problems.

SUMMARY OF THE INVENTION

Against this background and in accordance with a first aspect there is provided a method of securely storing data in a database comprising the steps of:
receiving data to be stored;
dividing the data into a plurality of elements;
encrypting each element of the plurality of elements with an encryption function; and
combining the encrypted elements to form a data attribute; and
storing the data attribute in the database. This provides a method of storing data securely whilst retaining an ability for encrypted columns, data attributes or fields to be searched. The elements may be array elements or other data types. The storing step may be carried out after the other steps have been performed. Each element may contain one or more characters or unit.

Optionally, the method may further comprise the step of removing from the data attribute either:
all numeric characters;
all non-numeric characters; or
all non-alphanumeric characters;
before storing the data attribute in the database. This provides a level of normalisation improving searchability and performance. A normalisation step, such as replacing types of characters may be carried out before the data are stored.

Optionally, the method may further comprise the step of replacing the removed characters with:
alpha characters; and/or
alphanumeric characters. This improves the distribution of data types within fields and aids performance. Removal and/or replacement of characters or values may be carried whilst the data is separated or after is combined. The replacement characters may be chosen according to a schema, for example.

Optionally, the method may further comprise the step of applying a second encryption function to the record before storing the record in the database. This improves security by reducing the ability to mount frequency or statistical based encryption attacks and to hide any patterns that may arise, such as those due to the replacement step or procedure. The encryption function or algorithm may be the same or different to that applied to the array elements. The key may also be different. The second encryption function or algorithm may be applied before the data elements are combined but either before or after any replacement of characters or other normalisation steps. This second encryption function may therefore be applied to individual characters or elements in a similar way to the first encryption function.

According to a further aspect, there is provided a database populated according to any of the described methods.

According to a second aspect, there is provided a method of searching a database having encrypted data attributes comprising the steps of: receiving a search term;
encrypting the search term with an encryption function; and
searching a database for records having data attributes matching the encrypted search term. This method allows the database to be searched on encrypted fields, columns or attributes. Therefore, the database may be searched for matches or partial matches (e.g. using the SQL LIKE function) without reducing security. The first aspect may be combined with the second aspect as a further combined method that may be incorporated into a system or distributed network, for example.

Optionally, encrypting the search term may further comprise the steps of:
dividing the search term into a plurality of elements;
encrypting each element of the plurality of elements; and
combining all of the encrypted elements to form the encrypted search term. In other words, the same or similar steps may be applied to the search terms or values as applied to the data before storage within the database.

Optionally, the method may further comprise the step of removing from the encrypted search term either:
all numeric characters;
all non-numeric characters; or
all non-alphanumeric characters;
before searching the database. This is a normalisation procedure used to improve data retrieval or storage performance.

Optionally, the method may further comprise the step of replacing the removed characters with:
alpha characters; and/or
alphanumeric characters.

Optionally, the method may further comprise the step of applying a second encryption function to the search term before searching the database. This function may be the same or different to the initial function and have a different key.

Preferably, the search may be performed by a SQL query. This may be a SELECT statement. Other database access languages or interfaces may be used.

Preferably, the method may further comprise the step of retrieving the records having data attributes matching the encrypted search term.

Preferably, the method may further comprise the step of decrypting the retrieved records.

According to a third aspect there is provided a system configured to execute the method or methods described above. The system may be a server, database server or other computer system, for example.

The system may also include a combination of logic (processors or servers, for example) configured to both securely store and to search for stored data.

The method may be executed as a computer program or application comprising program instructions that, when executed on a computer cause the computer to perform the method steps described above. The computer may include desktop, laptop, server, embedded computers, integrated circuits, chips embedded in other devices or appliances or other processors.

The computer program may be stored as a computer-readable medium or as a signal.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

Figure 1:
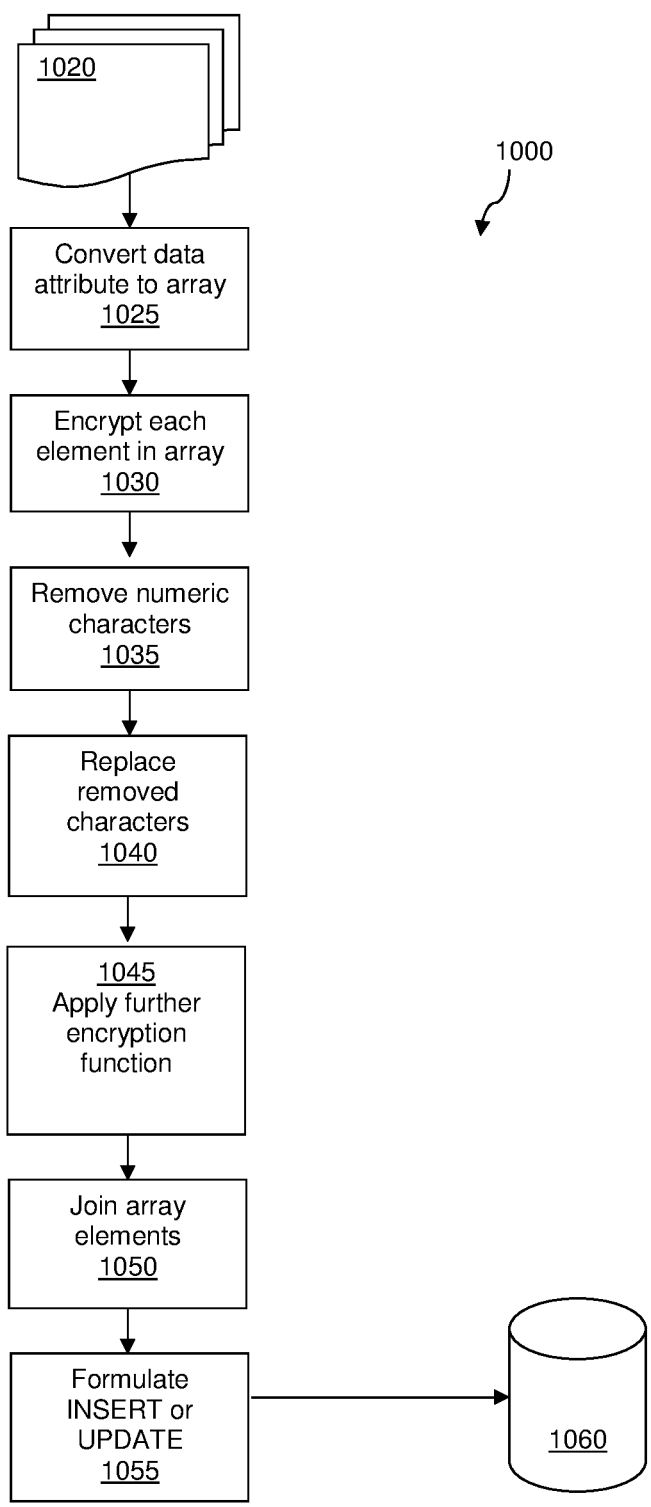
FIG. 1 shows a flowchart of a method for storing data in a database, given by way of example only.

It should be noted that the figures are illustrated for simplicity and are not necessarily drawn to scale.

DETAILED DESCRIPTION OF THE PREFERRED EMBODIMENTS

Starting from the same insert statement described in the background section above, i.e.:
INSERT INTO dataset (creditCardNumber, cardType, expiryDate, emailAddress, postalAddress) VALUES ('1234 4321 1234 4321', 'VISA', '00-00-00', 'someone@somewhere.com', '1 The Street, Postal Town, Somewhere')
any or all of the values may be encrypted. For example the creditCardNumber and expiryDate may be protected in this way.

This may be achieved by dividing each value or data attribute into individual characters (or other elements) and then placing each of these characters into a field of an array. Each element within this array may then be separately encrypted using an industry standard encryption algorithm, for example DES, AES, Twofish and Serpent.

Once each element in the array has been encrypted then all of the array elements may be recombined to form an updated or new value in the INSERT statement to store the encrypted data in the database. However, before this is done further steps may be taken to improve security and/or searchability. For example, the encrypted data may be normalised by removing any numerical characters and these may be replaced with a mixture of alpha and numeric characters, a further encryption of the resultant data attributes or values may also take place preferably with a different encryption key to that used on each array element. This may further disguise any potential patterns and improve security. Other types of normalisation or encryption may be used.

The SQL statement may be updated or replaced and executed to store the data in the database. Following this procedure it is not necessary to designate at the DBMS level that particular columns are encrypted as this has already been performed with generating the INSERT (or UPDATE) statement.

Searching in a database may take the form of a SQL statement such as a SELECT statement. For example, such a statement may be:
SELECT*FROM information WHERE creditCardNumber LIKE '%234%' and emailAddress='someone@somewhere.com'

This particular example selects statement attempts to find matches against values in the creditCardNumber field. As this field or attribute has been encrypted according to the previously described procedure then no valid data will be found using this SELECT statement. The following change to the select statement may be made to enable retrieval:

The values searched against encrypted fields or attributes have a similar procedure applied to them as that used to encrypt the original data within the database. This may be a simple encryption function or as mentioned above, dividing the values into individual characters and placing each of these characters in to an array element. Each array element may then be encrypted with the same encryption function used on the original data. Where the original data was normalised then this may be repeated, again by removing any numerical characters or other subsets of characters, and then replacing these with a mixture of alpha and numerical characters, for example. The array elements may be consolidated or combined to form a single value or string. A further or second encryption function may be applied to the value preferably with a different encryption key. The resultant value or string may be then reintroduced into the select statement, which is executed within the database. In other words, a similar procedure is applied to search terms that was used to encrypt the data in the first place. Therefore, matches may now be made. Separating the values into individual array elements (before applying a function such as the encryption function) facilitates individual character based searches or partial string searches.

FIG. 1 shows a flow chart of a method 1000 for storing data in a database. The data 1020 are analysed to determine which particular data components will be added to encrypted columns in the database 1060. Some or all of the columns may be encrypted. For the particular data attribute or attributes that require encryption, step 1025 divides the data into an array of elements in which each element is a separate character. At step 1030, each array element is encrypted according to a first encryption algorithm or function. At step 1035 any numeric characters that result from this encryption function are removed. At step 1040 these removed characters are replaced with replacement characters that may be alpha characters, numeric characters or a mixture of both.

At step 1045, a further encryption function is applied to the array elements, which are then joined together to form a single string or value (or particular data type expected by the database) at step 1050. At step 1055 a particular SQL procedure is formulated to add data to the database 1060 or to update existing data. This UPDATE or INSERT statement may include all encrypted fields or any mixture of some encrypted fields and some plain text fields. Execution of the INSERT or UPDATE SQL statement results in data being added or altered within the database 1060 with encrypted columns containing values derived from the method 1000. Unencrypted columns may have data added in plain text.

Figure 2:
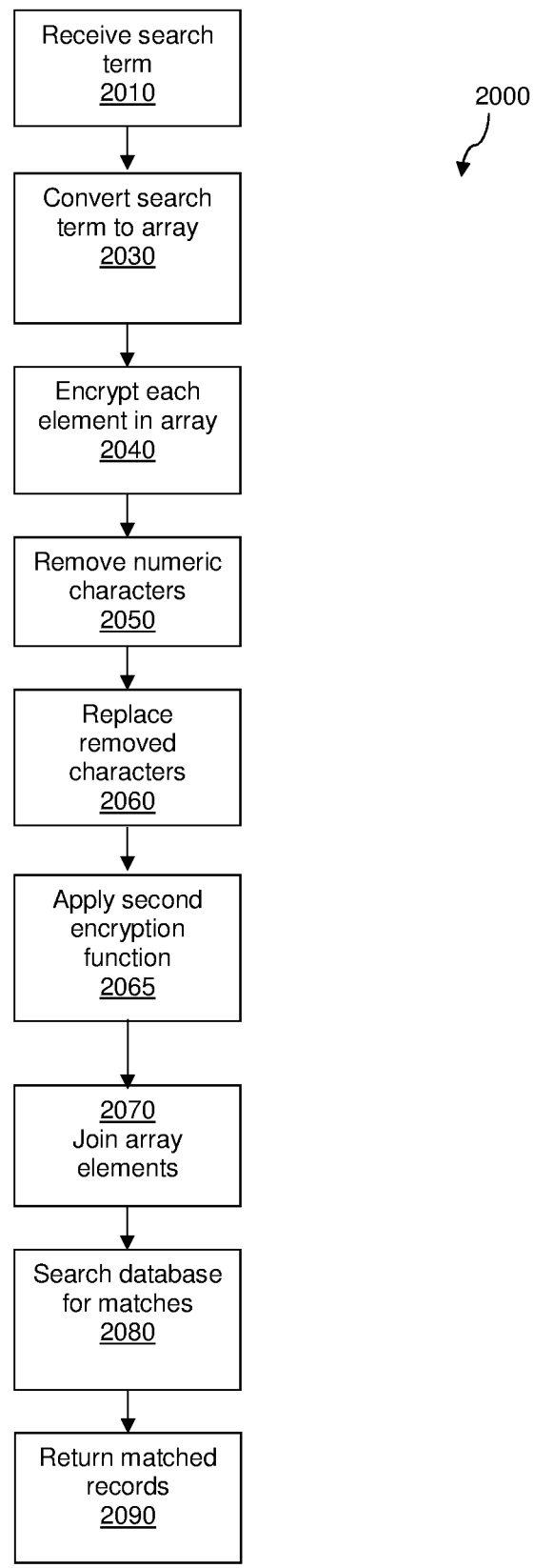
FIG. 2 shows a flowchart of a method for searching the database of FIG. 1.

FIG. 2 shows a flow chart of a method 2000 used to search or query the database 1060 populated with data according to method 1000. Search terms may be received from a variety of sources such as external systems, internal systems, network calls or Internet queries, for example. These search terms are received by the method at step 2010. For search terms that correspond with encrypted columns or data attributes then the following steps may be carried out. Such search terms are converted into an array at step 2030. In other words, each value in the search term is divided into separate characters or single digit integers and each is placed into an array element. Each array element is encrypted at step 2040 using a first encryption algorithm or function. At step 2050, any numeric character that results from the encryption is removed. Alternatively, other character sets may be removed. At step 2060 any removed characters are replaced by replacement characters such as numbers, letters or a mixture of both. At step 2065, a further, second encryption algorithm or function is applied to the array elements, which are joined together and at step 2070 to form a resultant string or value (or other data type). This string or value is formulated within a WHERE clause as part of a SELECT statement that may include other encrypted search terms and/or plain text search terms targeted at particular data attributes or columns in the database. The formulated query is then executed within the database to search for matches at step 2080. Any results are returned to the originating calling procedure at step 2090 in the originating format. Therefore, the returned data may be decrypted in to plain text using a reverse of the encryption function or functions originally applied.

In this way, a search term may be processed and executed to return results from a fully or partially encrypted database and encrypted or protected columns may also be searched without first decrypting large amounts of data or entire columns. A standard-type SQL query can be run against any or all encrypted field or columns within a database. Therefore such queries are not restricted to unencrypted fields or primary keys such as customer ID, for example. Any business data may be fully protected by encryption without jeopardising searching facilities. The method 2000 may be incorporated as an additional layer or function between a search interface and the encrypted database.

Figure 3:
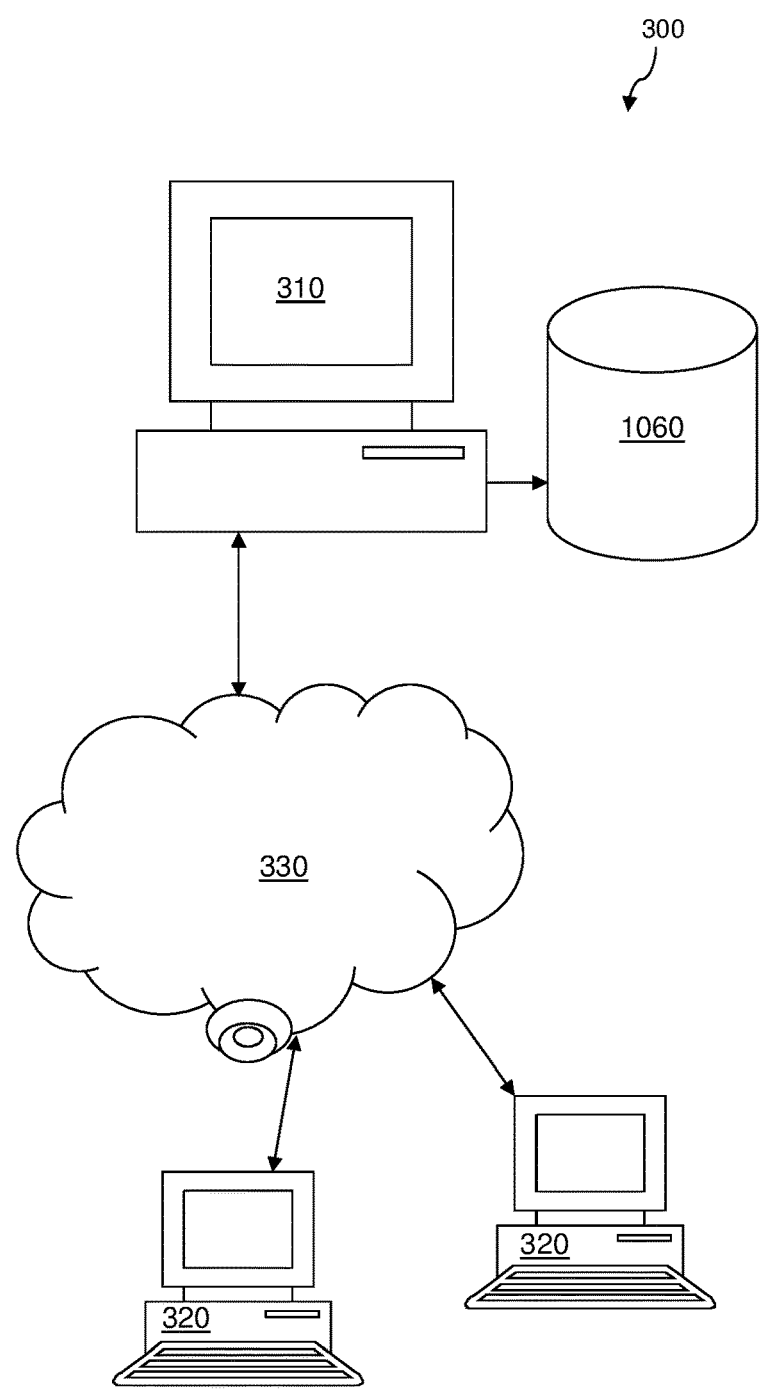
FIG. 3 shows a schematic diagram of a system for implementing the method of FIGS. 1 and 2, given by way of example only.

FIG. 3 shows a schematic diagram of a system 300 used to implement the methods described with reference to FIGS. 1 and 2. A server 310 with a suitable operating system such as for example, (Oracle) Sun Solaris, UNIX, Windows or Linux, runs a database management system such as for example Oracle RDBMS, MS SQL server or Ingres. Data may be added directly or across a network 330 from terminals or clients 320. These clients, terminals or other data feeds 320 may also execute queries to return data stored in the database 1060. Data sources and query originators may also be separate devices. External systems may also access and run queries on the database 1060 either across the network 330 or via other communication means. The network 330 may be an intranet, an Ethernet system or the Internet, for example.

As will be appreciated by the skilled person, details of the above embodiment may be varied without departing from the scope of the present invention, as defined by the appended claims.

For example, the embodiments described include specific database functionality such as SQL statements and commands. However, the methods and system may use different data storage facilities such as file and cloud based storage systems other than SQL or RDBMS servers or computers.

Normalisation or the replacement of characters may be done before or after the second (or further) encryption algorithm is applied for both the database storage or the search methods.

The array elements may contain more than one character or value such as whole words, for example.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method of securely storing data in a database comprising:
   receiving data to be stored;
   dividing the data into a plurality of elements;
   encrypting each element of the plurality of elements with an encryption function;
   combining the encrypted elements to form a data attribute that is searchable without decryption by a plurality of devices using a partial string and is decryptable by a decryption function by the plurality of devices; and
   storing the data attribute in the database.

2. The method of claim 1 further comprising removing from the data attribute either:
   all numeric characters;
   all non-numeric characters; or all non-alphanumeric characters;
before storing the data attribute in the database.

3. The method of claim 2 further comprising replacing the removed characters with:
alpha characters; and/or
alphanumeric characters.

4. The method of claim 1 further comprising applying a second encryption function to the record before storing the record in the database.

5. A system for securely storing data comprising:
a database; and
logic configured to:
receive data to be stored;
divide the data into a plurality of elements;
encrypt each element of the plurality of elements with an encryption function; and
combine the encrypted elements to form a data attribute that is searchable without decryption by a plurality of devices using a partial string and is decryptable by a decryption function by the plurality of devices; and
store the data attribute in the database.

6. The system of claim 5 further comprising logic configured to remove from the data attribute either:
all numeric characters;
all non-numeric characters; or
all non-alphanumeric characters;
before storing the data attribute in the database.

7. The system of claim 6 further comprising logic configured to replace the removed characters with:
alpha characters; and/or
alphanumeric characters.

8. The system of claim 5 further comprising logic configured to apply a second encryption function to the record before storing the record in the database.

9. One or more non-transitory computer readable media comprising computer readable instructions which, when executed, cause a system to securely store data in a database by:
receiving data to be stored;
dividing the data into a plurality of elements;
encrypting each element of the plurality of elements with an encryption function;
combining the encrypted elements to form a data attribute that is searchable without decryption by a plurality of devices using a partial string and is decryptable by a decryption function by the plurality of devices; and
storing the data attribute in the database.

10. The computer readable media of claim 9 further comprising computer readable instructions for removing from the data attribute either:
all numeric characters;
all non-numeric characters; or
all non-alphanumeric characters;
before storing the data attribute in the database.

11. The computer readable media of claim 10 further comprising computer readable instructions for replacing the removed characters with:
alpha characters; and/or
alphanumeric characters.

12. The computer readable media of claim 9 further comprising computer readable instructions for applying a second encryption function to the record before storing the record in the database.

* * * * *